Sept. 10, 1929.  C. E. QIUCK  1,727,672
DOUGH DEFLECTOR
Filed Nov. 2, 1928
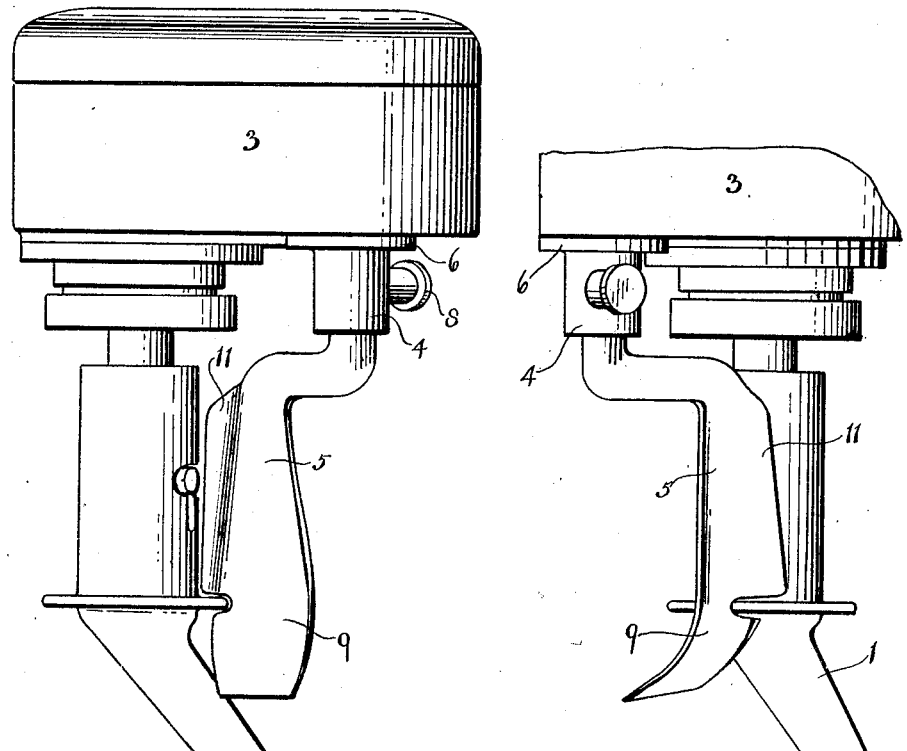
Inventor
CLAUDE E. QUICK,
By his Attorney
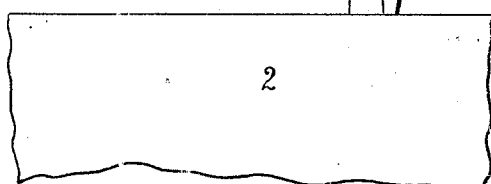

Patented Sept. 10, 1929.

1,727,672

UNITED STATES PATENT OFFICE.

CLAUDE E. QUICK, OF GLENDALE, CALIFORNIA, ASSIGNOR TO THE SOUTHERN CALIFORNIA SUPPLY CO., INC., OF LOS ANGELES, CALIFORNIA, A CORPORATION OF CALIFORNIA.

DOUGH DEFLECTOR.

Application filed November 2, 1928. Serial No. 316,847.

The present invention relates to mixing machinery and particularly to dough mixing machines of the kind in which mixing is effected by a rotary paddle or dough hook.

In such machines difficulty has been experienced from the material creeping or making its way up the paddle to the mixing shaft.

The invention has for its general object to obviate the difficulty referred to by providing a readily positioned deflector attachment which acts to scrape off dough or other material working upwardly toward the mixing shaft.

A further object of the invention is to provide an attachment of the kind described which may be adjusted to suit mixing machines of various sizes.

A still further object of the invention is to provide a deflector attachment consisting of a minimum number of parts and of a very rugged and durable construction. The preferred form of the invention is herein described and illustrated with reference to the accompanying drawings but it is to be understood that the invention is not limited to the specific embodiment described and illustrated, but only by the scope of the claims attached hereto.

In the accompanying drawings Fig. 1 is a view in side elevation showing the attachment mounted on a dough mixing machine, and Fig. 2 is a view taken at about 60° to Figure 1.

In the drawings similar reference indicate similar parts.

A dough mixing machine of the kind illustrated in the drawings comprises a dough container (2) arranged below a mixing member which comprises a hook or paddle depending from a rotatable member or head (3). The paddle or hook (1) is mounted so as to be rotated around its axis as well as to be moved around the container (2). This movement of the hook or paddle causes dough to be thoroughly stirred but it also causes the dough to work upwardly along the mixing hook. The rotating head (3) on which the mixing hook is mounted necessitates continuous observation in order to scrape off the dough to avoid dirtying of the dough with oil on the upper part of the mixing shaft or on the rotary head. The dough on the mixing shaft also tends to work into the fitting in which the mixing hook is mounted, making it difficult to remove or replace the hook.

The attachment of my invention is adapted to engage the dough as it works up the mixing shaft and guide it away from the shaft and so that it falls back into the mixing container. It also operates to depress the material that tends to rise in conical form at the central part of the mass through the operation of the hook or stirring member.

The deflector attachment essentially comprises two elements, a socket (4) and a scraper (5). The socket (4) is of any suitable form, as shown in the drawing, it comprises a basic member (6) provided with a bolt or screw holes by which it may be fastened to the lower face of the lower hook bracket of the machine and a bearing member provided with a bore to receive the stem of the deflector, a screw (8) being arranged to extend through the wall of the bearing member and into the bore whereby the deflector may be held in any desired position. The blade member (9) of the deflector comprises a stem portion advantageously of cranked form and a scraper blade provided with a cut away portion shaped to fit over the collar usually found on the mixing shaft. In the form shown the deflector is provided with a scraping edge (11) designed to abut the mixing shaft and with a deflector portion arranged at an angle to the scraping edge and causing the dough scraped off to run off into the mixing receptacle, clear of the mixing hook during the greater part of its revolution. The lower end part of the blade is flared to the rear, as the blade travels, to compress the dough mass that tends to rise in conical form at the central part of the mass through the operation of the stirring member 1.

By the construction described, adjustment is provided to enable the deflector to be fitted to mixing shafts of various lengths since the socket will enable the shaft of the deflector to be inserted a greater or less degree, while the cranked stem of the deflector member may be angularly adjusted in the socket member so as to closely engage against the shaft of the mixing paddle or hook which shaft may be of varying diameter on various machines.

It is pointed out that since there is no relative movement of the scraper and the mixing shaft, or mixing hook of a character such that the operator might get a hand or finger caught, the danger of injury to the operator which is present when the operation of scraping dough from the machines in general use is avoided.

It is believed the description given will enable a clear idea of the construction and operation of the device of my invention to be obtained.

What I claim is:

1. A mixing machine provided with a container to hold the material; the combination with a rotatable head mounted in the machine above the container, including a driven shaft extending from the under side of the head; of a stirring member mounted at its upper end on the shaft, operative to move the material from the sides of the container toward the center thereof; and a blade mounted on the head to extend in parallel relation to the upper part of the stirring member with the width of the blade extending across the path of travel of the blade as the head rotates, said blade operating to depress the material tending to rise at the central part of the mass of material through the action of the stirring member.

2. In a mixing machine provided with a container to hold the material; the combination with a rotatable head mounted in the machine above the container, including a driven shaft extending from the under side of the head; of a stirring member mounted at its upper end on the shaft, operative to move the material from the sides of the container toward the center thereof; and a blade mounted on the head to extend in parallel relation to the upper part of the stirring member with the width of the blade extending across the path of travel of the blade as the head rotates, said blade being flared at its lower end to trail the blade as the latter is revolved by the rotation of the head and the blade also being flared toward its inner vertical edge and forward of its travel, said blade operating to deflect the material from the adjacent part of the stirring member and also to depress the material tending to rise at the central part of the mass of material through the action of the stirring member.

C. E. QUICK.